United States Patent [19]
Randall et al.

[11] Patent Number: 5,511,037
[45] Date of Patent: Apr. 23, 1996

[54] COMPREHENSIVE METHOD OF PROCESSING MEASUREMENT WHILE DRILLING DATA FROM ONE OR MORE SENSORS

[75] Inventors: Russel R. Randall, Katy; David M. Schneider, Spring; Mark W. Hutchinson, Houston; Steven L. Hobart, Spring, all of Tex.

[73] Assignee: Baker Hughes Incorporated, Houston, Tex.

[21] Appl. No.: 142,599

[22] Filed: Oct. 22, 1993

[51] Int. Cl.$^6$ .................. G01V 11/00; G01V 3/18; G01V 44/00
[52] U.S. Cl. .............. 367/33; 367/81; 364/422; 324/369
[58] Field of Search ............. 367/25, 33, 35, 367/81–83; 364/422; 250/254; 175/50; 324/369

[56] References Cited

U.S. PATENT DOCUMENTS

| | | | |
|---|---|---|---|
| 5,130,949 | 7/1992 | Kan et al. | 367/33 |
| 5,146,167 | 9/1992 | Strikland et al. | 364/422 |
| 5,329,235 | 7/1994 | Zhou et al. | 324/369 |
| 5,343,440 | 8/1994 | Kan et al. | 367/27 |
| 5,431,056 | 7/1995 | Volkmann | 73/631 |

FOREIGN PATENT DOCUMENTS 654687  5/1995  European Pat. Off. .

OTHER PUBLICATIONS

Hutchinsen, M. W.; SPWLA Book 19969, SRLA #480693, pp. 327–334, Jan. 1993; Abst. only Reviewed.
Hutchinson, M. W.; 66th Annu. SPE Tech Conf. Oct. 6, 1991, pp. 741–754; Abst. Only Considered.
Schneider et al; 35th Annu. SPWLA Logging Symp., Jun. 19, 1994, Trans. v–2, Pap. No. RR.

*Primary Examiner*—Nelson Moskowitz
*Attorney, Agent, or Firm*—Gunn & Associates

[57] ABSTRACT

The present invention relates to the transformation of measurement while drilling (MWD) data acquired during various time intervals into corresponding equal depth intervals. Once the data are transformed into the depth domain, depth based statistical, filtering sensor resolution matching and depth shifting techniques are utilized. The transformation process maximizes sensor vertical resolution while minimizing observed and statistical errors associated with sensor response.

35 Claims, 6 Drawing Sheets

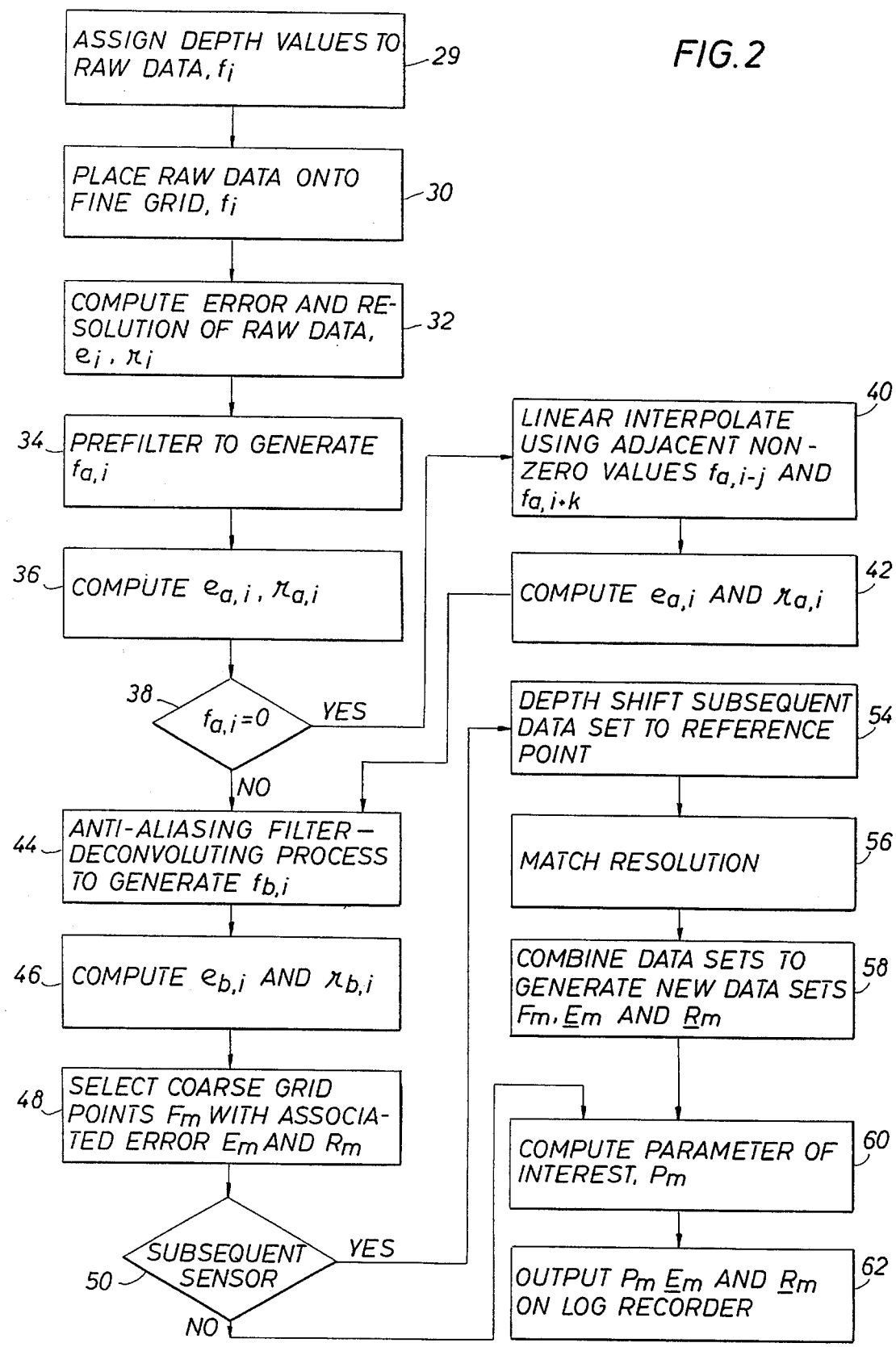

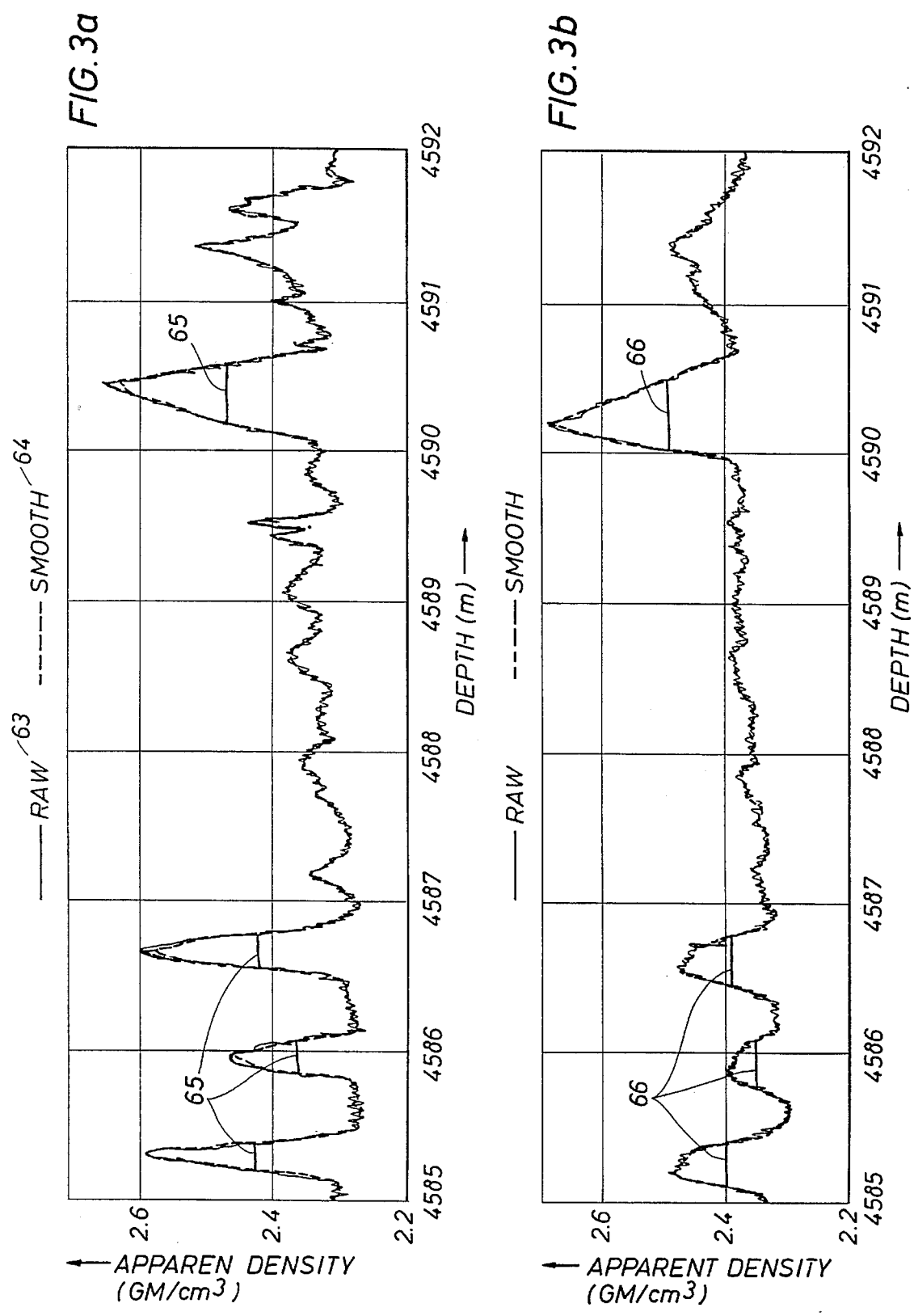

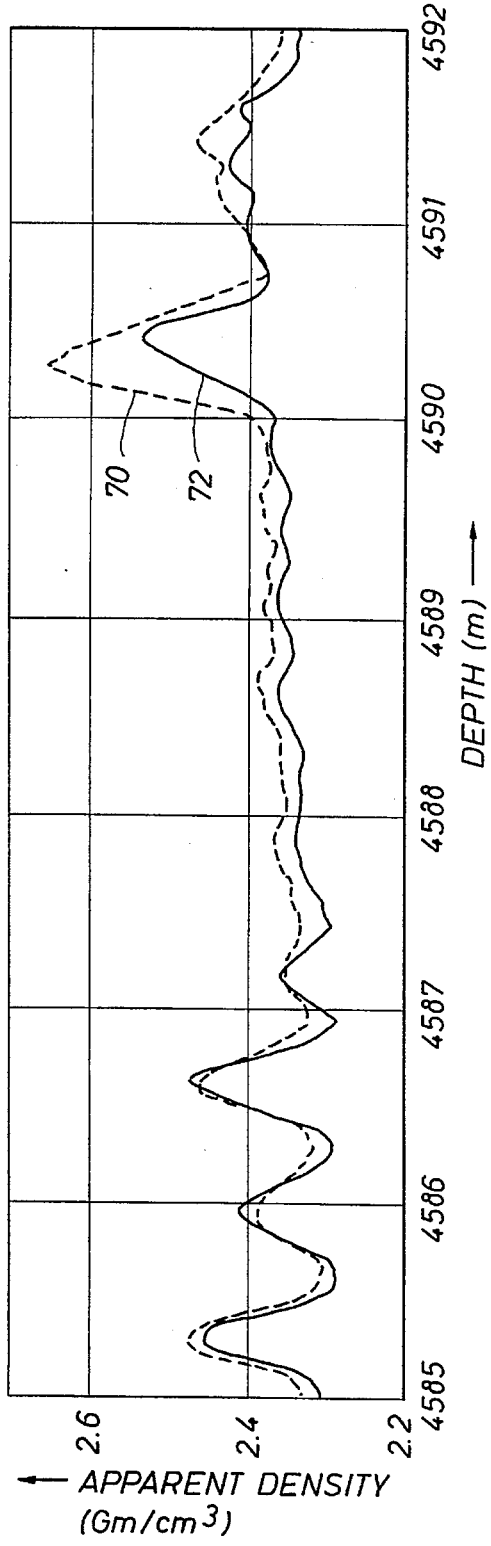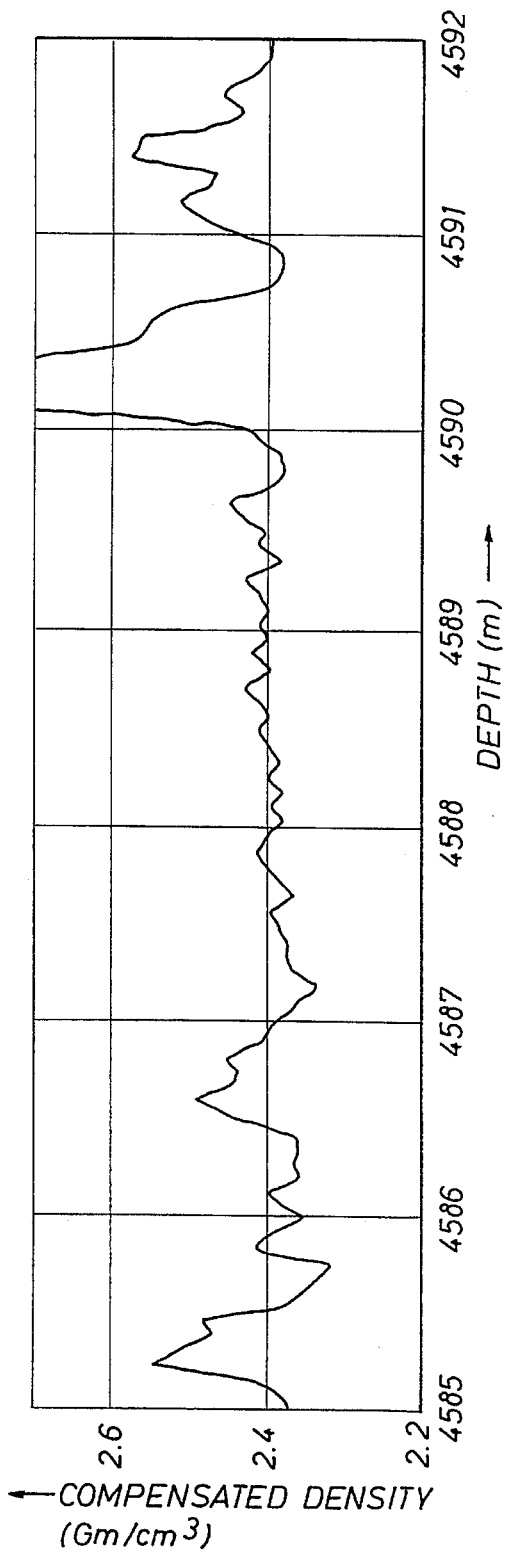

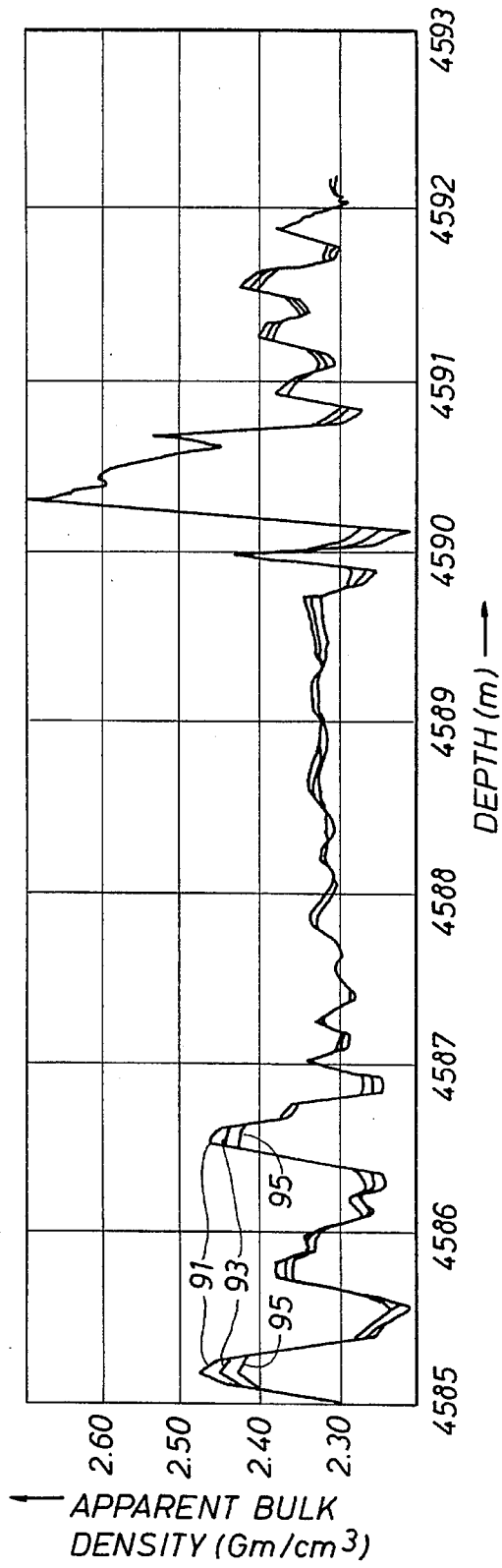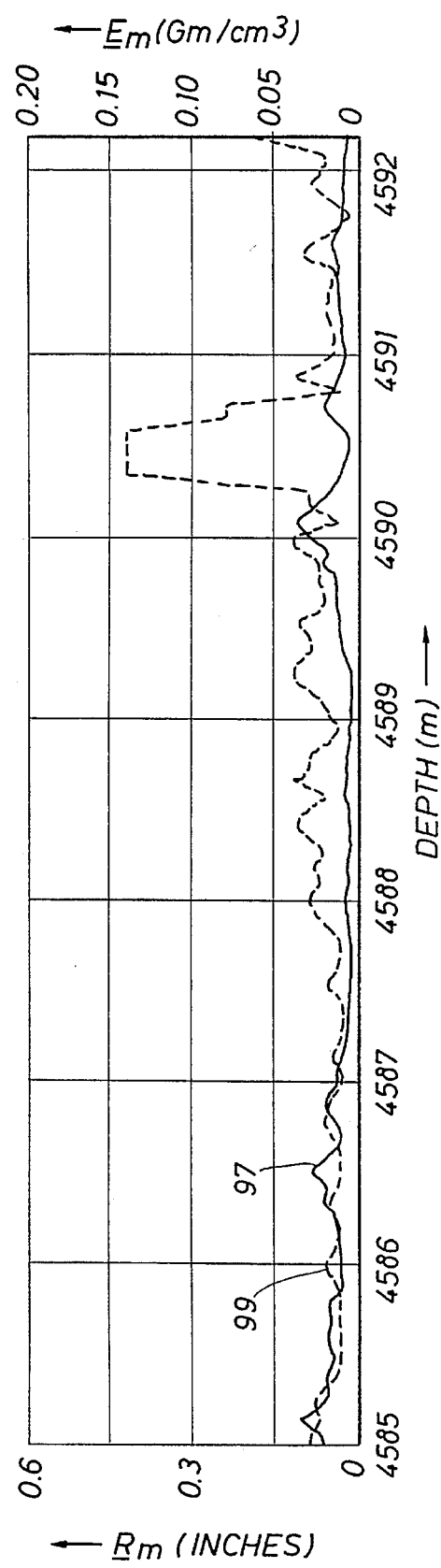

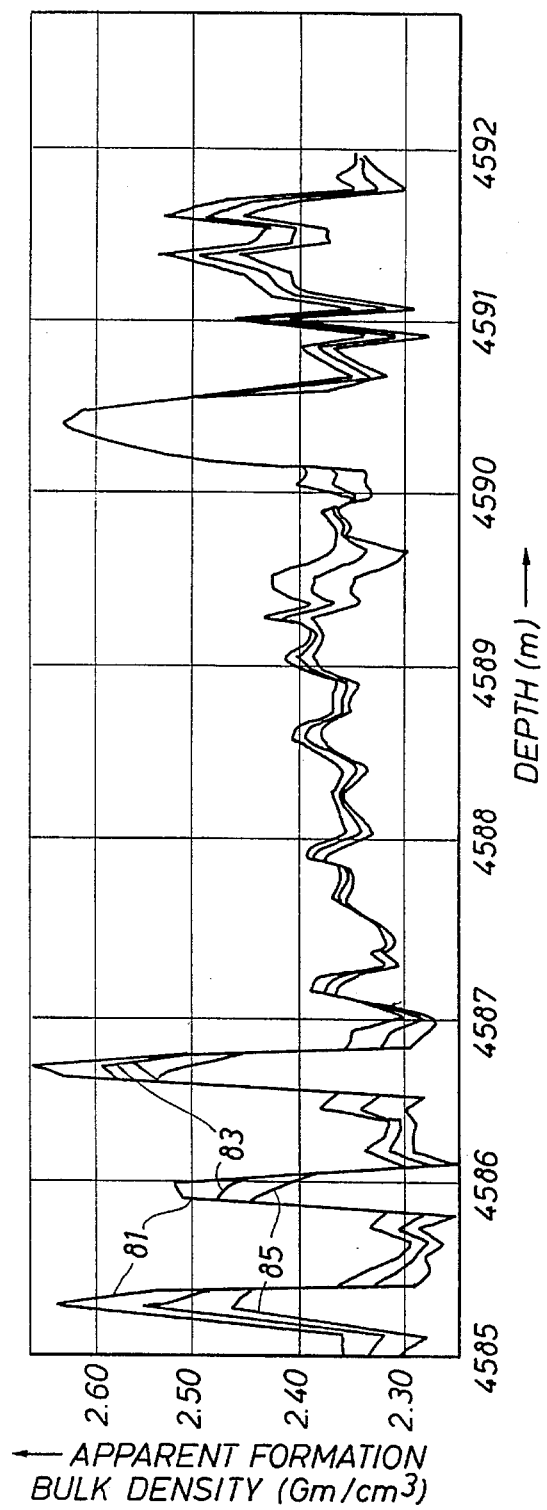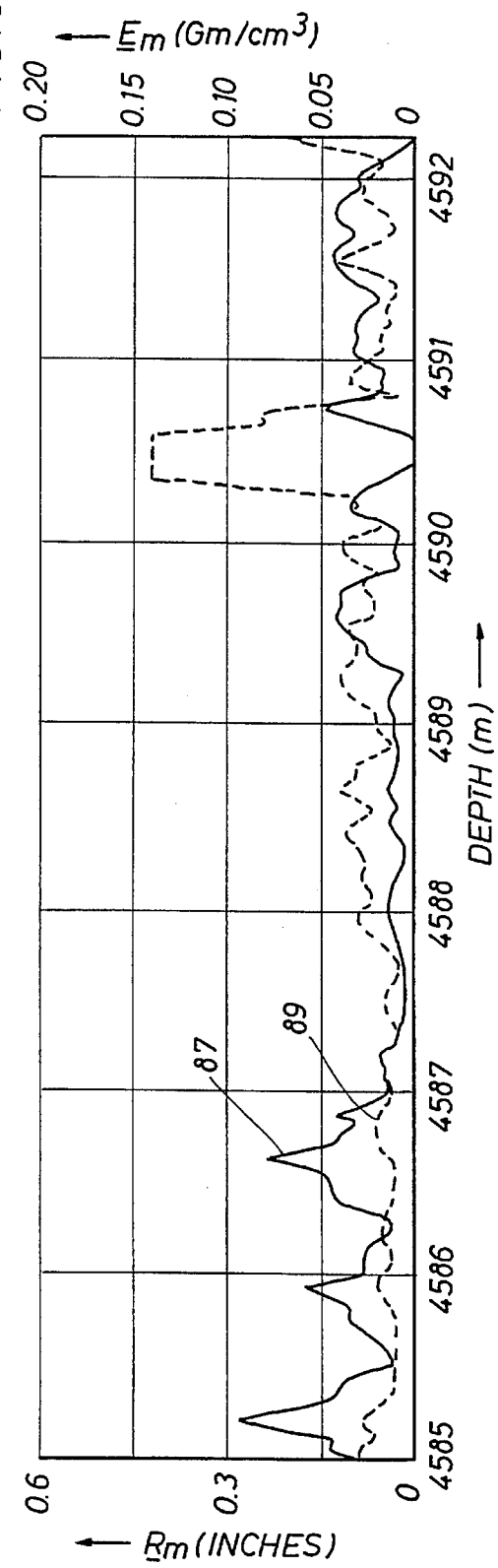

COMPREHENSIVE METHOD OF PROCESSING MEASUREMENT WHILE DRILLING DATA FROM ONE OR MORE SENSORS

BACKGROUND OF THE INVENTION

The present invention relates to processing of data obtained during the drilling of a well borehole. These data are typically produced by sensors positioned in the vicinity of the drill bit and are telemetered to the surface in real time for process for processing or alternatively recorded down hole in real time for subsequent processing and analysis.

In the exploration and production of hydrocarbons, numerous techniques are used to analyze earth formations penetrated by a borehole. Wireline measurements involve a sensor bearing logging tool or sonde which is lowered and raised at a constant predetermined rate within the borehole. Data from the downhole sensors are transmitted to the surface by way of the cable used to raise and lower the logging tool. The resulting "logs" are graphical or digital tabulations of the measured parameters of interest as a function of depth within the well bore and are used to analyze prospective formations for hydrocarbon content. Data in wireline logging operations are typically collected over evenly spaced depth intervals since the final product is a depiction of measured parameters as a function of depth. Collection of data in this manner is controlled by depth indicator signals generated by the system as the speed at which the logging tool is raised or lowered within the well bore. Wireline measurements must be made after the well bore has been drilled. Such measurements can be adversely affected by the build up of mud cake from the drilling fluid and/or other physical changes which occur in the vicinity of the borehole in the time interval between the drilling and logging operation.

There are many advantages in making parametric measurements of interest during the actual drilling operation. The formation is relatively unperturbed and valuable information concerning the petrophysics of the penetrated formations and the physical condition of the borehole can be obtained in real time or near real time. Sensors can indicate in real time when the geological formation of interest has been reached. High pressured formations can be detected at the time of penetration thus permitting steps to be taken to prevent damage to the well bore, drilling equipment and personnel. Measurement while drilling (MWD) is accomplished by placing sensors in the vicinity of the drill bit and either (a) telemetering data to the surface in real time or (b) recording the data downhole to be retrieved and processed intermittently during routine retrieval of the drill string for replacement of the drill bit. Sensors responsive to temperature, pressure, gamma radiation, neutrons, acoustic energy and electromagnetic energy can be used in the MWD system. The primary disadvantage of MWD over wireline measurements lies in the slow rates of data transmission and recording when drilling at fast rates of penetration. When MWD data are recorded in real time, telemetry to the surface is typically via the drilling fluid column since there is no direct electrical connection between the downhole sensors and the surface equipment. Current drilling fluid telemetry rates are of the order of bits per second while wireline telemetry rates over the logging cable are orders of magnitude greater. In addition, MWD data are created during equally spaced time intervals, whether telemetered directly to the surface or recorded downhole for subsequent surface retrieval and processing. To display MWD data as a function of depth and utilize well established depth based signal processing and analysis technology implemented at surface located equipment, MWD data must be accurately transformed from the dynamic time domain to the depth domain. The time to depth domain transformation is not a simple function since the penetration rate of the drill bit is neither constant nor predictable. In addition, transformation can result in gaps in the depth based data resulting from slow MWD data acquisition rates. When drilling at slow rates of penetration, MWD data can be acquired at a much finer axial resolution than wireline data. Existing wireline processing techniques are often inappropriate for MWD data. The present inventive disclosure pertains to new processing techniques which have been developed for the correct conversion of normally evenly spaced time based data to evenly spaced depth based data which maintain the maximum amount of information from the raw data as well as define the quality of the data.

Seismology involves the measurement of reflected or refracted acoustic waves in the time domain and the conversion or "migration" of these data to the depth domain. Acoustic energy is imparted at the surface of the earth and reflections or refractions from subterranean features exhibiting contrasts in acoustic impedance (the product of acoustic velocity and density) are measured at the earth surface in the time domain. Time domain measurements are then converted to depth domain thereby giving the depth of the perturbing subterranean features. Depth conversions are only as accurate as the knowledge of acoustic impedance of all intervening geological strata. U.S. Pat. No. 5,229,940 to Shein S. Wang and David W. Bell teaches a method of generating three dimensional seismic images of earth formations from a series of conventional two dimensional seismic traces or lines. The methods are directed solely to seismic technology wherein no well boreholes are involved. Seismic processing involves the conversion of reflected or refracted acoustic waves measured as a function of time into amplitude as a function of depth using offset velocity measurements and assumptions. The current invention involves the conversion of borehole environs data measured as a function of time into corresponding data as a function of depth using well defined time to depth conversion steps.

The analysis of returned drilling fluid in a well borehole drilling operation is commonly known as "mud" logging. The returned drilling fluid is analyzed for traces of hydrocarbons including gas, and the returned drill cuttings are analyzed to determine the porosity, lithology and permeability of the strata being penetrated by the drill bit. Fluid and cuttings are analyzed at the surface of the earth and must be assigned a depth of origin in order to correlate with conventional wireline logs, MWD logs and seismic data. U.S. Pat. No. 5,237,539 to Thomas H. Selman teaches methods of determining the "lag" time for the returned drilling fluid to travel from the drill bit to the surface. This, when correlated with the known depth of the drill bit, allows one to assign a depth of origin corresponding to each volumetric increment of returned drilling fluid. The subject patent also teaches depth correlation of lag time parameters with parameters measured in real time including drill bit depth, rate of penetration, weight on bit drill string revolutions per minute and drilling fluid pump pressure. Real time and lag time parameters plotted as a function of depth constitute a conventional "mud" log. All of the teachings of the subject patent involve measurements at the surface wherein no downhole sensors are employed. All data are acquired during equal depth intervals rather than during equal time intervals. The patent also teaches depth correlation of real and lag time parameters using a simple linear depth shift of the data. There is no teaching of quality indicators reflecting the accuracy or reliability of the lag time conversions.

SUMMARY OF THE INVENTION

A primary object of the current invention is a more correct conversion of MWD data normally acquired at evenly spaced time intervals, but unevenly spaced depth intervals, into evenly spaced depth intervals so that readily available methods of data processing, analysis and presentation can be utilized.

Another objective of the present invention is the filling of any gaps in the data resulting from slow data acquisition rates when the data are converted to evenly spaced depth intervals. This process involves interpolation of adjacent non-zero data points.

Another feature of the present invention is the tracking and display of the quality of the data as a function of depth when the depth sample intervals vary with drill bit penetration rates. Quality parameters include the signal to noise ratio, the depth resolution and statistical precision of the data and resulting parameters computed from the measured data.

Another aspect of the present invention is the enhancement of raw data resolution when raw data are both precise and finely sampled.

Another benefit of the present invention is the proper combination of data from multiple sensors disposed within the vicinity of the drill bit. Such sensors are usually spaced at different offset axial locations along the drill collar and exhibit different measure reference points and axial resolutions. When parameters of interest such as formation density, formation porosity, formation resistivity and the like are computed from the combined responses of two or more sensors, data are shifted to a common measure point and axial resolution of all sensors are matched.

Still another aspect of the present invention is the alignment of measure points and the matching of axial resolutions of two or more parameters measured with a single sensor. Examples are apparent formation density and apparent formation photoelectric factor measured with a single sensor using scattered and absorption gamma ray techniques. It is well known in the art that these measurements exhibit different effective measure points and axial resolutions although gamma radiation is measured with a single sensor.

An output of the present invention is the tracking of the quality of parameters such as density, porosity, resistivity and the like computed from the response of multiple sensors, and the processing applied to each response.

Basic Processing

Transformation of data acquired at evenly or unevenly spaced time intervals, giving rise to unevenly spaced depth intervals, into evenly spaced depth intervals comprises the steps of (a) passing data through a prefilter process to place individual raw data points and groups of points, measured during evenly spaced time intervals, onto points of a corresponding fine uniformly spaced depth grid, (b) an interpolation process to fill those grid points not occupied by data, and (c) then the step of a second filtering and decimation process to put the data on an evenly spaced coarse depth grid that is required for normal log analysis.

The prefilter is a center weighted filter of width 2l, where l is the spacing of the fine grid. The center of this filter is moved in increments of l along the depth axis containing the unevenly spaced data. If an isolated data point is within a distance of l/2 of the center of the filter, the data point is placed at the grid point on which the filter is centered. If more than one data point falls within the filter, the data points are weighted by the filter shape, points closer to the center of the filter being weighted heavier, and a weighted average data point is computed. The weighted average data point is then placed at the filter center depth.

As a result of the prefiltering process, some grid points contain data while others are empty. Those empty grid positions are filled by interpolation between adjacent points containing data. As an example, if one point is empty and the points immediately above and below contain data, a simple linear interpolation can be used and the empty point is filled with the average of the two adjacent data points. Ideally, it would be better to avoid interpolation by decreasing the acquisition time intervals of the measuring process, thereby decreasing the average depth intervals of the data. Practical problems of processing, data acquisition rates and nuclear statistics, if applicable, associated with the measurement lead to lower limits on time acquisition.

The final step is the decimation of the fine grid data onto a desired coarse grid whose spacing is a multiple of the fine grid. Before decimation can occur, a low pass filter is applied to the data on the fine grid to prevent aliasing. The cutoff frequency, $f_c$, of the filter should be the equal to the Nyquist frequency (wave number) of the coarse grid. That is, $f_c=\frac{1}{2}L$ where L is the spacing of the coarse grid. A deconvolution process is applied to the data to optimize the axial resolution of the measurement. After filtering and deconvolution, only those points on the fine grid a distance L apart are kept with the remaining points being discarded. As an example, if the fine grid has a spacing of ¾" and the coarse grid has a spacing of 3", only every fourth point of the fine grid is retained.

Additional Processing

For cases where two or more axially spaced sensors are used or more than one parameter is measured with a single sensor, additional processing is applied to combine the measurements. In both cases, the measure points of each measurement may be offset with respect to each other. In addition, axial resolutions of each sensor may differ. As a result, combining measurements requires both depth shifting and resolution matching of one measurement with respect to another.

Depth shifting to a common measurement point can be done on the raw or evenly spaced data. If the raw data are shifted, the shifted data are then processed as previously described where shifted data are placed on the same evenly spaced grid as defined for the reference sensor. If the sensor spacings are an integer multiple of the spacing of either the fine or the coarse grid, depth shifting is accomplished with a simple integer shift of either the fine or the coarse grid.

After depth shifting, the data from one or more additional sensors are again filtered to match the depth resolution of the reference sensor. Resolution matching filters are determined from the impulse response functions of the sensors. After depth resolutions are matched, the data from all sensors are then combined to compute the parameters of interest as a function of depth.

Quality Control

As previously mentioned, the quality of the data changes due to variations in drilling rate in depth transformed spacings. The quality of the data is not generally obvious from the log of the processed parameters of interest. To enhance the value of the log, the quality indicators (a) precision (repeatability) (b) depth or axial resolution of the measurements and (c) the signal to noise are tracked. In addition, this information can be used to control an adaptive filter, with filter characteristics governed by some criteria of data quality. Such an adaptive filter may be used to partially deconvolve sensor response, or to reduce noise to some predetermined level.

The observed error, and statistical error if applicable, of each raw data point can be computed as will be detailed later. This error is tracked when the data are placed onto the fine grid. If several closely spaced points are averaged together, the error of the averaged point is computed. Also tracked with each point on the fine grid is the spacing between raw data points. This spacing represents an "irreducible" resolution length. That is, vertical details of the penetrated earth formation finer than the irreducible resolution can not be resolved.

When interpolated points are generated, appropriate spacing numbers and precision numbers are assigned. After the anti-aliasing or other filter or deconvolution is applied to the data, the precision errors and resolution lengths of the data are recomputed and tracked. Both precision errors and resolution lengths are presented on the log along with the petrophysical parameters of interest thereby providing the log analyst with valuable indicators of the quality of the measured data.

BRIEF DESCRIPTION OF THE DRAWINGS

So that the manner in which the above recited features, advantages and objectives of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 2 depicts a flow chart for data processing as detailed in the current disclosure;

FIG. 3 illustrates a comparison of apparent formation density as computed from the response of a short axially spaced sensor and a long axially spaced detector using the raw data as recorded in equal time intervals and using data transformed to equal depth intervals using the methods of the invention;

FIG. 4 illustrates a log of apparent formation density as computed from the response of a short axially spaced sensor and a long axially spaced sensor measure point alignment and sensor resolution matching using methods of the invention;

FIG. 5 illustrates a log of formation density which has been compensated for adverse effects of the borehole by combining the apparent formation densities computed from the responses of the short spaced and long spaced sensors; and FIG. 6 illustrates logs of the quality of the apparent density measurements made by the short axially spaced and long axially spaced sensors.

DETAILED DESCRIPTION OF THE INVENTION

Figure 1:
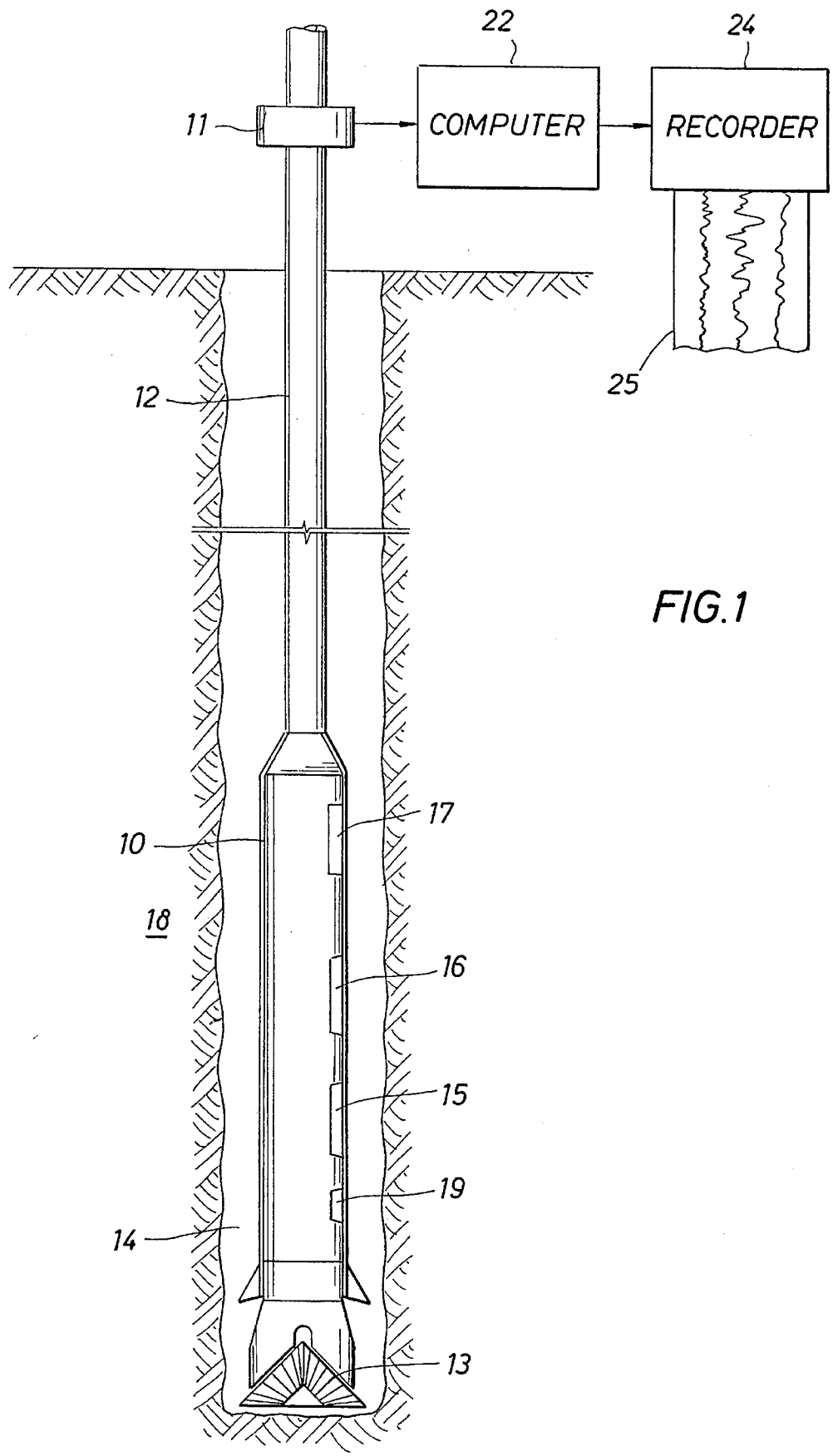
FIG. 1 is a generalized illustration of a drilling system employing MWD for determination of earth formation and borehole parameters.

Data collected from downhole sensors in MWD operations are normally collected during evenly spaced time intervals. These data are either telemetered to the surface in real time for processing or are recorded downhole for retrieval and processing when the drill string is pulled from the well bore to change the drill bit. Data can also be collected during unevenly spaced time intervals. This requires the data to be normalized to a unit time interval before further processing as detailed below. Data acquisition may also be intermittent. An example would be termination of data collection upon interim cessation of drilling. Again, data must be normalized to a unit time interval before further processing. The preferred embodiment is the collection of data in evenly spaced time intervals.

Analyst are interested in formation parametric measurements as a function of depth within the well bore. This permits the analyst to correlate MWD logs with conventional wireline logs of offset wells, seismic data, geological maps and other information used to evaluate the well being drilled. This information regarding adjacent wells will always have depth related characteristics. In addition, data processing and interpretation techniques which have been developed over the years are, in general, depth based resulting from their origins in wireline logging and seismic processing. It is advantageous, therefore, to convert MWD data to the depth domain rather than time base. The conversion of MWD data from the time to depth domain is not a simple process. This is due to the fact that the penetration rate of the drill bit is not constant in time. Time to depth domain conversion of MWD data, in addition to treating variable bit penetration rate, must also preserve the precision and axial or vertical resolution of the various downhole measurements. In measurements involving nuclear processes, optimization of the statistical precision of the measurements is especially critical. Finally, if the responses of two or more sensors are used to compute the parameters of interest, vertical resolution of the sensors must be matched to avoid spurious signals while still optimizing resolution and signal to noise ratio. The current invention meets all of these key criteria.

FIG. 1 illustrated a typical drilling system employing MWD apparatus. The MWD tool 10 is mounted on the drill string 12 in the immediate vicinity of the drill bit 13. A standard drilling rig (not shown) is employed for control of the drill string in the borehole 14 within an earth formation 18. The invention as disclosed is applicable to data from one or more sensors within the MWD tool 10. For purposes of illustrating the preferred embodiment, a short axially spaced sensor 15, a second long axially spaced sensor 16, and a radiation source 19 are depicted. The sensors 15 and 16 are powered with suitable power sources (not shown) within the tool 10. Data are either stored in a recorder (not shown) within the tool 10 for later retrieval or are telemetered by a transmitter 17 to the surface to a receiver 11 for real time processing by a central processing unit (CPU) 12. After processing using methods to be detailed, the output parameters of interest are passed to a recorder 24 wherein the log 25 of the parameters of interest as a function of depth is produced.

A flow chart of the data processing algorithms associated with the current invention is shown in FIG. 2. In the preferred embodiment, raw data $f_i$ from a sensor which is acquired at evenly spaced time intervals, but unevenly spaced depth intervals. Corresponding depth intervals are assigned to the raw data $f_i$ at step 29. These data are next placed onto a corresponding fine, uniformly spaced depth grid with spacing l between points. Note that being unevenly spaced in depth, the data set is not aligned with the evenly spaced grid points at this stage of the processing. This step is illustrated at 30 of the flow chart. The error $e_i$ associated with each corresponding value of $f_i$ is next computed in step 32. For nuclear data, the well known Poisson statistical error associated with the counts is computed at 32. The spacing $r_i$ between each point $f_i$ on the fine grid is computed at the step 34. Both $e_i$ and $r_i$ are tracked throughout processing and eventually result in quality logs which will give the analyst an indication of the error and vertical resolution of the quantities of interest.

The data are prefiltered at the step 34 to place individual raw data points and groups of raw data points, measured during equally spaced time intervals, onto the points of the fine equally spaced depth grid. The preferred prefilter is a center weighted filter of length 21. The filter is moved in increments of l along the fine grid. If an isolated data point is within a distance of l/2 of the center of the filter, the data point is placed at the depth of the center of the filter. If more than one data point falls within the defined weighted filter, the data points are weighted by the filter shape, points closer to the center of the filter being weighted heavier, and the weighed average is computed. Stated mathematically:

$$f_{a,i} = \frac{\sum\limits_j w_{i-j} f_j \Delta u_j}{\sum\limits_j w_{i-j} \Delta u_j} \quad (1)$$

where $f_{a,i}$ is the value of the prefiltered data point assigned to grid point i of the fine grid, $w_{i-j}$ are the weighting functions and j denotes the raw data points falling within the filter centered at grid point i. If one assumes that all values of $\Delta u_i$ the spacings between raw data points, are equal, then equation (1) reduces to $$f_{a,i} = \frac{\sum\limits_j w_{i-j} f_j}{\sum\limits_j w_{i-j}} \quad (2)$$

The intervals $\Delta u_i$ are not equal as previously discussed. In practice, however, if the length of the filter is small when compared to the actual measured variation of the data, then the assumption introduces negligible error. The error $e_{a,i}$ and resolution $r_{a,i}$ associated with prefiltered data $f_{a,i}$ are computed at the step 36.

As a result of prefiltering, some points of the fine grid contain no data. Each grid point is tested at the step 38. Those empty grid positions are filled by mathematical interpolation between the nearest adjacent non-zero grid points $f_{a,i-j}$ and $f_{a,i+k}$ at step 40. One such interpolation scheme is given in equation (3);

$$f_{a,i} = \frac{[f_{a,i-j}/(i-j)] + [f_{a,i+k}/(k-i)]}{[1/(i-j)] + [1/(k-i)]} \quad (3)$$

where i denotes the fine grid point being filled by interpolation, and the indices i−j and i+k denote the nearest adjacent grid points containing data on either side of grid point i. Associated error and resolution are computed at the step 42. An observed or "noise" error is also estimated from the variance of a line fit to all non-interpolated points within the detector response length. This gives the noise level, with the rationale being that negligible changes due to the formation will occur within the response length of the detector. Poisson statistical error is also computed for interpolated and non-interpolated points. Poisson statistical error for interpolated data points are obtained by well known statistical error propagation techniques. The systematic or noise error is used for $e_{a,i}$ unless the noise level is less than the statistical error. In this situation, $e_{a,i}$ is set to equal the statistical error. Many techniques can be used to calculate the resolution parameter $r_{a,i}$ ranging from a simple tracking of spacing between raw data points to more complex expressions involving sensor response functions, associated error and sample rate.

At this juncture, the fine grid of spacing l has been filled with data. The fine grid is then decimated onto a more conventional coarse grid once the fine grid data have been processed with anti-aliasing filter, see the step 44. Signal processing theory states that the Nyquist frequency $f_c$ is the maximum frequency supportable on a grid of spacing L and further that $f_c=\frac{1}{2}L$. An anti-aliasing filter that exhibits a sharp cut-off at the Nyquist frequency is applied to further filter the data and obtain $f_{b,i}$. The function sin(x/T)/x which is centered on a l=¾" grid of in the range of 20 to 60 points in the preferred embodiment. The number of points can be varied without significant loss of information so long as the filter length is longer than the correlation length of the data. The Fourier transform of a function of the form sin(ax)/x yields a step function of amplitude π when ω is less than a and greater than −a. The length constant T can therefore be set to give the desired cut-off frequency ω=2 πfc where in the preferred embodiment, $f_c$ is the Nyquist frequency of a coarse grid with spacing L=3.0". Therefore T=1/w=1/(2πf_c). Since $f_c=\frac{1}{2}L$, T=L/π=0.995" for the preferred embodiment. A deconvolution process is also applied to the data at step 44 in order to enhance the axial resolution of the measurement.

After anti-aliasing filtering and decobvolution, the associated errors, $e_{b,i}$, and resolutions, $r_b$, are computed at the step 46.

Continuing with the description, the step 48 is the decimation of the fine grid l onto the coarse grid L where L is a multiple of l. After filtering, only those points on the fine grid with a spacing of L are kept with the remaining points being discarded. In the preferred embodiment where l=¾" and L=3", only every fourth point on the fine grid is kept. This decimated data set is now designated as $F_m$ with associated error and resolution values of $E_m$ and $R_m$, respectively.

Going further with the description, the step 50 queries the presence of more than one sensor or if more than one parameter is measured using the same sensor. If additional sensors or multiple measurements from a single sensor are used, previously explained steps 30 through 48 are repeated for the second or subsequent set of raw data. Multiple sensors axially spaced within tool 10 or multiple parameter measurements from a single sensor will usually exhibit different effective measure points. When combining responses of two or more data sets to obtain the parameter of interest, it is necessary to shift the second and subsequent data sets so that the effective measure point(s) are aligned with the measure point of a designated reference sensor or measurement. Depth shifting can be done on raw data or on evenly spaced data resulting from filtering at step 34 or step 44. If raw data from a subsequent sensor are shifted, processing steps 30 through 48 are applied to the shifted data set. If the effective sensor spacings are integer multiples of either the fine grid spacing or the coarse grid spacing, depth shifting is accomplished with a simple integer shift of either the fine or the coarse grid. The latter event is depicted as step 54 in FIG. 2.

One additional process must be applied to data from multiple sensors or multiple measurements from a single sensor before they are combined to compute parameters of interest. The vertical responses or vertical resolution of multiple sensors are not necessarily identical and, in the majority of applications, are significantly different. Combining multiple responses across any geological boundary penetrated by the drill bit will give unrealistic results unless the axial resolutions are matched. The procedure is to match the higher resolution measurement to the lower resolution measurement. In the case of applications involving induced nuclear measurements, the higher resolution sensor closer to the source of radiation is matched to the sensor spaced farther from the source of radiation. Resolution matching is accomplished at step 56 by applying a convolution filter to the high resolution sensor. The convolution filter is defined as a function, when convolved with the response function of the high resolution sensor, that yields the response of the low resolution sensor. In frequency space, this is a convolution equated to a product. The frequency components of the unknown resolution matching function are calculated by dividing the frequency components of the low resolution sensor impulse response by the frequency components of the high resolution impulse response.

At this point in the processing algorithm, the data which were originally measured in equally spaced time intervals have been converted to evenly spaced depth intervals. In the case of multiple sensors, data have been depth shifted and the resolution(s) of the sensors have been matched. The parameter of interest, designated as $P_m$, is computed at the step 60 from the response of one sensor or by combining the response of two or more sensors. Error associated with each data point has been computed and propagated through the various processing steps so that error $\underline{E}_m$ is assigned to each corresponding value of $P_m$. Spacing between raw data points has also been tracked through the various processing steps allowing a vertical resolution parameter $\underline{R}_m$ to be assigned to each corresponding value of $P_m$. $P_m$ and the quality parameters $\underline{E}_m$ and $\underline{R}_m$ are recorded as a function of depth by the recorder 24 at step 62.

As stated previously, tracking of the quality indicator error and resolution is a valuable aid to the analyst in interpreting MWD logs. Quality indicators are also valuable means for driving adaptive filters. Error is not only a function of sensor design and sample rate but it is also a function of the physical characteristics of the formation. Using induced nuclear measurements as an example, measured counting rates control the statistical precision of the measurement and are also a function of the characteristics of the formation. In addition, it is well known that the response of a sensor moving across a bed boundary in an induced nuclear measurement is altered by the contrast of the adjacent beds. Stated in another way, the contrast at bed boundaries can impact vertical resolution. In addition, formations can vary the imputed measure points of sensors in induced nuclear applications. Quality indicators as disclosed are, therefore, ideally suited to adaptively vary filter characteristics depending upon actual downhole conditions encountered. Adaptive filtering is used to maximize statistical precision and axial resolution, and is especially applicable in the preferred embodiment at the depth shift step 54 and resolution matching step 56 of the processing algorithm.

Applications

A formation density measurement, compensated for the adverse effects of the borehole, will be used to further illustrate the preferred embodiment of the invention. The measurement equipment involves two gamma ray sensors or detectors axially spaced from a source of gamma radiation mounted in the immediate vicinity of the detectors. These detectors are known as the short spaced and long spaced detectors to those skilled in the art. The physical basis of the gamma-gamma dual detector compensated density measurement was first presented in the paper "The Dual Spacing Formation Density Log", J. S. Wahl, J. Tittman, and C. W. Johnstone, Journal of Petroleum Technology, December, 1964 and is hereby referenced. It is again emphasized that the current invention is not limited to the dual detector compensated density measurement or to nuclear measurements in general, but it is applicable to measurements made by one or more sensors of any type in the time domain.

FIG. 3a illustrates the plot 63 of apparent formation density computed from raw data from the short spaced detector plotted as a function of depth in the well borehole in meters. These data are compared with the same raw data processed through the decimation step 48 and computational step 60. FIG. 3b illustrates a similar plot from the long spaced detector. It is apparent that both the processed short and long spaced density measurements closely track the raw data. It should be noted, however, that the short spaced detector exhibits superior vertical resolution as is exhibited by the relatively small full-width-half-maxima 65 compared with 66 of the major density excursions. It should also be noted that the measure point of the short spaced detector is "deeper" than that of the long spaced detector. This is due to the fact that in the example the short spaced detector is closer to the source of gamma radiation which, in turn, is closer to the drill bit 13. If one attempted to combine the data depicted in FIGS. 3a and 3b to obtain a density computation, or to use other combinations of multiple parameters with depth resolution mismatches, serious error would be introduced as a result of resolution mismatch and data shift. This error would be especially pronounced in zones where density is rapidly changing.

FIG. 4 shows apparent formation density 70 and 72 computed from the response of the long and short spaced detectors, respectively, as a function of depth after the depth shifting step 54 and resolution matching step 56. It is apparent that the two sensors are on depth and that resolution has been matched as illustrated by the near overlays of density excursions at 4585.3 m, 4586.0 m and 4586.7 m.

FIG. 5 shows a borehole compensated formation density computed from the apparent formation density as measured with the short and long spaced detectors using computational concepts previously referenced. It is apparent that the compensated density curve exhibits no unusual excursions such as "spikes" or "horns" at bed boundaries indicating proper depth shifting and resolution matching.

FIG. 6 shows a quality logs of corresponding error indicators $\underline{E}_m$ and resolution indicators $\underline{R}_m$, again plotted as a function of depth within the well borehole in meters. FIG. 6 depicts apparent formation density 83 as measured by the short spaced detector, while the curves 81 and 85 define the one observed standard deviation uncertainty limits associated with the parameter of interest. Using previously defined nomenclature, the curve 81 represents $\underline{P}_m + \underline{E}_m$ and the curve 85 represents $\underline{P}_m - \underline{E}_m$. FIG. 16 is the corresponding plot of associated error $\underline{E}_m$ curve 89 and resolution $\underline{R}_m$ 87 associated with the apparent density measurement 83 from the short spaced detector. FIG. 6c illustrates the one standard observed uncertainty limits 91 and 95 of the apparent formation bulk density 93 measured by the long spaced detector, while FIG. 6d illustrates the corresponding error 99 and resolution 97 associated with the density measurement 93. It is again emphasized that error and resolution calculations can also be made for the compensated bulk density as well as apparent densities calculated from the long and short spaced detectors.

Those skilled in the art will recognize modifications and refinements to the preferred embodiment, including adaptive filtering, variations of fixed filter types, and variations in the number, types and positions of the sensors. Such enhancements and modifications are within the scope of the present invention as identified in the following claims.

What is claimed is:

1. A method for translating raw data acquired from a MWD system operating in a well borehole wherein the raw data are acquired at spaced time intervals and are translated onto corresponding evenly spaced depth intervals, the method comprising the steps of;
   (a) acquiring raw data in spaced time intervals using a sensor in a well borehole and comprising a part of a MWD system;
   (b) assigning to said raw data, depth values corresponding to the locations of acquisition;
   (c) placing said raw data onto a first evenly spaced depth grid;
   (d) positioning data onto points of said first depth grid by filtering said raw data using a first depth filter thereby creating a second data set;
   (e) for selected points of said first evenly spaced depth grid not containing data, providing data for said points by interpolating adjacent points of said first evenly spaced depth grid containing data;
   (f) applying a second filter, a deconvolution process or both to said second data set creating a third data set;
   (g) placing said third data set onto a second evenly spaced depth grid with spacing greater than said first evenly spaced depth grid; and
   (h) retaining elements of said third data set which fall upon the grid points of said second evenly spaced depth grid thereby creating a fourth data set.

2. The method of claim 1 wherein the errors associated with said raw data acquired at spaced time intervals are tracked through each step in the translation of said raw data to said fourth data set.

3. The method of claim 2 wherein the axial resolution associated with said raw data collected at spaced time intervals are tracked through each step of the translation of said raw data to said fourth data set.

4. The method of claim 2 wherein said tracked errors are used to adaptively adjust the first filter, the second filter, the deconvolution process or any combination thereof.

5. The method of claim 3 wherein said tracked resolutions adaptively adjust the first filter, the second filter, the deconvolution process or any combination thereof.

6. The method of claim 3 wherein said tracked errors and said tracked resolutions are used to adaptively adjust the first filter, the second filter, the deconvolution process or any combination thereof.

7. A method for translating two or more raw data sets acquired with a MWD system operating in a well borehole where the raw data are acquired at spaced time intervals and are translated onto corresponding evenly spaced depth intervals, the method comprising the steps of;
   (a) acquiring, in timed intervals, sets of raw data from one or more sensors mounted within said MWD system;
   (b) assigning to said raw data in each set depth values corresponding to the locations of acquisition;
   (c) placing said raw data from each said set onto a first evenly spaced depth grid;
   (d) positioning data onto points of said first evenly spaced depth grid by filtering each said raw data set using a center weighted first filter thereby creating second data sets;
   (e) for any point of said first evenly spaced depth grid not containing data for a given second data set, filling said point for each given said second data set by interpolating adjacent points containing data within said given second set;
   (f) applying a second center weighted filter, a deconvolution process or both to each said second data set thereby removing any aliasing and thereby creating third data sets;
   (g) placing each of said third data sets onto a second evenly spaced depth grid with spacing an integer multiple of said first evenly spaced depth grid; and
   (h) retaining elements of each of said third data sets which fall upon the grid points of said second evenly spaced depth grid thereby creating forth data sets.

8. The method of claim 7 wherein the errors associated with each said raw data set are tracked through each step in the translation of raw data sets to said fourth data sets.

9. The method of claim 8 wherein the axial resolutions associated with each said raw data set are tracked through each step of the translation of said raw data sets to said fourth data sets.

10. The method of claim 8 wherein said tracked errors are used to adaptively adjust the first filter, the second filter, the deconvolution process or any combination thereof.

11. The method of claim 9 wherein said tracked axial resolutions are used to adaptively adjust the first filter, the second filter, the deconvolution process or any combination thereof.

12. The method of claim 9 wherein said tracked errors and said tracked axial resolutions are used to adaptively adjust the first filter, the second filter, the deconvolution process or any combination thereof.

13. The method of claim 7 wherein said raw data sets exhibit different axial measure points and axial resolutions and:
   (a) said fourth data sets are shifted to a common axial measure point thereby forming fifth data sets;
   (b) said fifth data sets are processed to match axial resolutions of the sensors thereby forming sixth data sets;
   (c) said sixth data sets are combined to yield computed parameters of interests from the borehole environs and earth formations traversed by said MWD system;
   (d) errors and axial resolutions associated with each data set are tracked from said first raw data sets through said sixth data sets and are used to determine parametric errors and parametric axial resolutions of said computed parameters of interest; and
   (e) said parameters of interest and said parametric errors and parametric axial resolutions are recorded as a function of depth within said well borehole.

14. The method of claim 7 wherein the raw data are acquired in evenly spaced time intervals.

15. A system for acquiring and translating one or more raw data sets from at least one sensor in a MWD system operating in a borehole wherein the raw data are acquired at spaced time intervals and are translated onto corresponding evenly spaced depth intervals, comprising:
   (a) sensor means for a MWD system for acquiring said raw data from a well borehole;
   (b) means for receiving said raw data from said sensor or sensors;
   (c) means of assigning a depth value to each measured raw data value corresponding to the location of acquisition;
   (d) means for positioning each of said raw data sets onto a first evenly spaced depth grid;
   (e) means for positioning data onto points of said first evenly spaced depth grid by filtering said raw data sets using a center weighted first filter thereby creating second data sets;

(f) for any point of said first evenly spaced depth grid not containing data for a given said second data set, means of filling said point for each given second data set by interpolating adjacent points containing data within said second data set;

(g) means for applying a deconvolution process, a second center weighted filter, or both to each said second data set thereby removing any aliasing and thereby creating third data sets;

(h) means for placing said third data sets onto a second evenly spaced depth grid with the spacing of said evenly spaced depth grid being an integer multiple of said first evenly spaced depth grid;

(i) means for retaining elements of each said third data sets which fall upon a grid point of said second evenly spaced depth grid thereby creating a fourth data sets; and (j) means for recording said fourth data sets.

16. The system of claim 15 further comprising means for tracking errors associated with said raw data sets through each step of the translation of said raw data sets to said fourth data sets.

17. The system of claim 16 further comprising means for tracking axial resolutions associated with said raw data sets through each step of the translation of said raw data to said fourth data set.

18. The system of claim 16 further comprising means for using said tracked errors to adaptively adjust the first filter, the second filter, the deconvolution process or any combination thereof for each data set.

19. The system of claim 17 further comprising means for using said tracked axial resolutions to adaptively adjust the first filter, the second filter, the deconvolution process or any combination thereof for each data set.

20. The system of claim 17 further comprising means for using said tracked errors and said tracked axial resolutions to adaptively adjust the first filter, the second filter, the deconvolution process or any combination thereof for each data set.

21. The system of claim 17 wherein two or more sensors are spaced at different axial locations within said MWD system and further comprising:

(a) means of adjusting said first filter, said second filter, said deconvolution process or any combination thereof based upon the values of said tracked errors and said tracked resolutions for each said sensor;

(b) means for shifting said fourth data sets to a common axial measure point thereby forming fifth data sets corresponding to the response of each said sensor at common measure points;

(c) means for processing said fifth data sets to match axial resolutions of said sensors thereby forming a sixth data set corresponding to the response of each said sensor;

(d) means for combining said sixth data sets from each said sensor to yield computed parameters of interest of earth formations and borehole environs traversed by the MWD system;

(e) means for tracking said errors and said axial resolutions associated with said raw data sets to said sixth data sets;

(f) means for converting said errors and said axial resolutions associated with said sixth data sets into parametric errors and parametric resolutions of said computed earth formation and borehole environs parameters of interest; and (g) means for recording said parameters of interest and said parametric errors and said parametric axial resolutions as a function of depth of said common measure point of the MWD system within said well borehole.

22. The system of claim 15 wherein raw data are acquired at evenly spaced time intervals.

23. The system of claim 15 wherein said sensors acquire raw data induced by a source of radiation within the MWD system.

24. The system of claim 15 wherein said sensors acquire raw data induced by a source of acoustic energy within the MWD system.

25. The system of claim 15 wherein said sensors acquire raw data induced by a source of electromagnetic data within the MWD system.

26. The system of claim 15 wherein said sensors acquire ray data resulting from naturally occurring radioactive material within earth formations traversed by the MWD system.

27. A method of translating raw data acquired from a MWD system operating in a well borehole wherein the raw data are acquired at spaced time intervals and are translated onto corresponding evenly spaced depth intervals, the method comprising the steps of:

(a) acquiring raw data in spaced time intervals using a sensor in a well borehole and comprising a part of a MWD system;

(b) assigning to said raw data, depth values corresponding to the locations of acquisition;

(c) placing said raw data onto an evenly spaced depth grid;

(d) positioning data onto points of said depth grid by filtering said raw data using a first depth filter thereby creating a second data set;

(e) for selected points of said evenly spaced depth grid not containing data, providing data for said points by interpolating adjacent points of said evenly spaced depth grid containing data; and (f) applying a second filter to said second data set thereby creating a third data set.

28. The method of claim 27 wherein the errors associated with said raw data acquired at spaced time intervals are tracked through each step in the translation of said raw data to said second data set.

29. The method of claim 28 wherein the axial resolution associated with said raw data collected at spaced time intervals are tracked through each step of the translation of said raw data to said second data set.

30. The method of claim 28 wherein said tracked errors are used to adaptively adjust the first, second or both of said depth filters.

31. The method of claim 29 wherein said tracked resolutions are used to adaptively adjust the first, second or both of said depth filters.

32. The method of claim 29 wherein said tracked errors and said tracked resolutions are used to adaptively adjust the first, second or both of said depth filters.

33. A system for acquiring and translating raw data from at least one sensor in a MWD system operating in a well borehole wherein the raw data are acquired at spaced time intervals and are translated onto corresponding spaced depth intervals, comprising:

(a) sensor means for a MWD system for acquiring said raw data from a well borehole;

(b) means for receiving raw data from said sensor or sensors;

(c) means for assigning a depth value to each measured raw data value corresponding to location of acquisition;

(d) means of positioning raw data onto an evenly spaced grid;

(e) means of positioning data onto points of said evenly spaced grid by filtering said raw data using a first center weighted depth filter thereby creating a second data set;

(f) for any point of said evenly spaced depth grid not containing data for said second data set, means of filling said point by interpolating adjacent points containing data within said second set;

(g).. means for applying a second center weighted depth filter to said second data set thereby removing any aliasing and thereby creating a third data set; and (h) means of recording said third data set.

34. The system of claim 33 further comprising means of tracking errors and resolutions associated with said raw data sets through each step of the translation of said raw data to said third data set.

35. The system of claim 34 further comprising means of using said tracked errors, tracked resolutions or both to adaptively adjust the first, second or both of said depth filters.

* * * * *